Oct. 4, 1966     A. M. MOOS     3,276,909
FUEL CELL ELECTRODES
Filed April 6, 1961
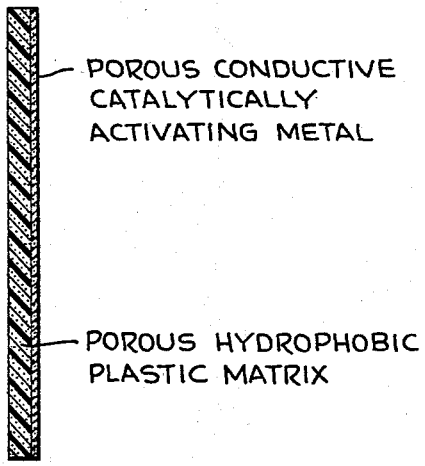
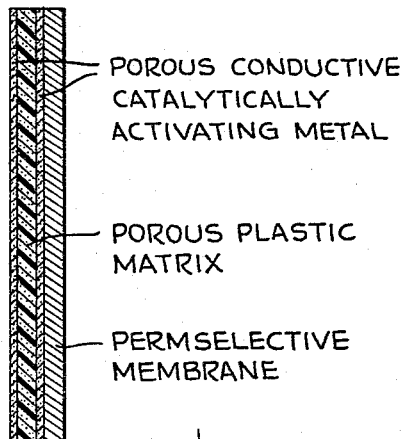
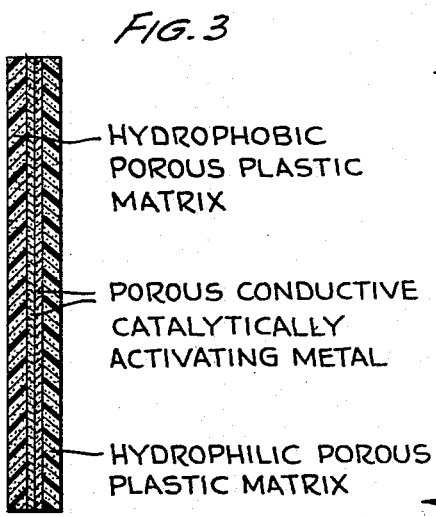
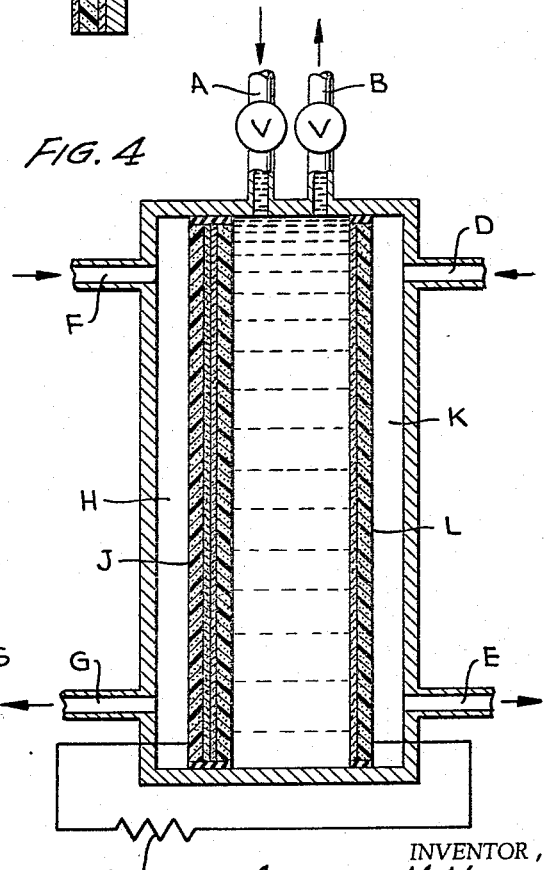
INVENTOR,
ANTHONY M. MOOS

United States Patent Office 3,276,909
Patented Oct. 4, 1966

3,276,909
FUEL CELL ELECTRODES
Anthony M. Moos, Ossining, N.Y., assignor to Leesona Corporation, Cranston, R.I., a corporation of Massachusetts
Filed Apr. 6, 1961, Ser. No. 101,057
10 Claims. (Cl. 136—86)

This invention relates to improved fuel cell electrodes and to their method of manufacture. More particularly, the invention relates to electrodes constructed from porous plastic sheets or films in contact with a catalytically active metal. The catalytic metal applied to the porous plastic materials are either intrinsically electrically conductive or are made electrically conductive by admixing with an electrical conductor, or by depositing onto their surface an electrically conductive film or screen which in turn is in direct contact with the plastic porous structure. These electrodes possess a high degree of catalytic activity and are amenable to the fabrication of a variety of electrode structures.

In the prior art, fuel cell electrodes have generally consisted of macro-porous structures (pore sizes ranging from about 1 to about 100 microns) which are electrically conductive and electrochemically active. These electrodes in a fuel cell system, permit the establishment of a three phase interface of the fuel or oxidant, i.e., a gas or liquid feed, solid active electrode and ionic electrolyte either by a difference in the structure, such as the use of a dual porosity layer or by contacting the electrode interface with a matrix retaining the electrolyte. At the interface, the fuel or oxidant is chemisorbed; ion exchange taking place through the electrolyte and electron transfer taking place through the electrically conducting electrode. The electrical charge is drained from the electrodes through an external circuit and the fuel ions react with the oxidizing ions to form a neutral product.

In a fuel cell system using the above described macroporous electrode structures, it is necessary to carefully regulate the interfaces of solid electrodes, feeds, gaseous or liquid, and electrolyte by suitable combination of pore size of the electrodes, pressure differential of the gas and the surface tension of the electrolyte in order to prevent flooding of the electrodes or have gas bubble through into the electrolyte unconsumed. A method of controlling the interface is accomplished by use of a bi-porous electrode structure where the large pores front the fuel gas side of the electrode and the small pores face the electrolyte. However, prior art bi-porous structures are expensive to manufacture since they necessitate the use of carefully fractionated metal or carbon particles.

Accordingly, it is an object of the present invention to provide a porous fuel cell electrode which effectively controls the interface, and yet is relatively inexpensive.

It is another object of the invention to provide a porous electrode which has at least one hydrophilic surface.

It is another object of the invention to provide a porous electrode which has at least one hydrophobic surface.

It is still another object of the invention to provide porous electrode structures which are tailored to a given fuel cell system.

It is another object of this invention to provide a fuel cell electrode which is relatively light in weight.

These and other objects of the invention will become apparent from the following detailed description with particular emphasis on the examples.

In general, the instant electrodes are composed of hydrophobic or hydrophilic porous polymer sheets having thicknesses ranging from about 0.001 to about 0.05 inch, a porosity ranging from about 40 to about 90%, and uniform pore size distribution in the range of from about 0.1 to about 50 microns, which sheets are used as supports for a catalytic material. The catalyst applied to the porous plastic supports are either intrinsically electrically conductive or are made electrically conductive by admixing the catalyst with an electrical conductor or depositing onto their surface an electrically conductive film or screen which is in intimate contact with the porous plastic structure. The catalytically active materials are formed onto the porous plastic structure either as thin films of the pure elements, alloys or oxides thereof, or they can be applied to suitable supports such as carbon black or alumina which enhances their catalytic activity, and the support structure brought in intimate contact with the porous plastic.

The porous plastic sheets which are used to support the catalyst can be any polymeric material, either hydrophilic or hydrophobic, which has a porosity of from about 40–90% and a uniform pore size distribution of from about 0.1 to about 50 microns. These polymers are exemplified by cellophane and its derivatives, fluorinated hydrocarbons, polyurethane, polyethylene, polystyrene, porous polyvinyl chloride, polypropylene, methylmethacrylate, styrenated alkyd resins and polyepoxide resins such as Epon 1001, 864 and 828 manufactured by the Shell Chemical Company. Virtually, any polymeric plastic material can be used which is porous and capable of supporting a catalyst.

The novel electrode structures of the invention can be fabricated in various forms, both as to geometric configurations and as to the position of catalytic layers, depending primarily upon the end use being considered. Specific illustrative structures are:

(1) A catalytic material such as silver, nickel or platinum is deposited onto both sides of a porous hydrophilic or hydrophobic polymer film or sheet so as not to substantially change the material's porosity or pore size distribution.

(2) A catalytic material is applied to only one side of a hydrophobic porous plastic structure. The electrode is used in a fuel cell wherein the catalytically active surface faces the electrolyte and with the hydrophobic surface facing the gas or liquid feed (fuel or oxidant).

(3) The catalytic materials are applied to only one side of a hydrophilic porous plastic structure. The electrode is employed in fuel cells with the catalytically active surface in contact with a gas or liquid feed (fuel or oxidant) and the plastic structure in contact with an aqueous electrolyte.

(4) A sandwich-type structure is formed having as its elements structures (2) and (3) above with the two catalytic surfaces contacting each other, which surfaces are not necessarily the same, wherein the hydrophilic layer faces an aqueous electrolyte, and the hydrophobic layer faces the gas or liquid feed of a fuel cell system.

(5) A sandwich-type structure is formed by using the structure described in (1) above and applying or coating the catalytic surface with a continuous film of a cationic or anionic ion exchange resin, the ion exchange film thickness preferably being not greater than about .001 inch.

(6) A sandwich-type structure is formed by using the structure described in (2) and applying or coating the catalytic surface with a continuous film of a cationic or anionic ion exchange resin, the ion exchange film thickness preferably being not greater than about .001 inch.

(7) A sandwich-type structure is formed by using the structure described in (3) and applying or coating the catalytic surface with a continuous film of a cationic or anionic ion exchange resin, the ion exchange film thickness preferably not being greater than about .001 inch.

(8) A structure is formed such as (5), (6) or (7) where the thin film applied to the catalytic surface is a hydrophilic ion permeable, non-ion exchanging, non-porous membrane such as cellophane or stabilized polyvinyl alcohol, the thickness of the film being less than about 0.01 inch.

(9) A fuel cell electrode is formed consisting of a homoporous catalytically active structure covered on one side with a non-porous, non-ion exchanging, ion permeable membrane, the ion permeable membrane being in contact with the electrolyte.

In the drawing, FIGURES 1, 2, and 3 illustrate cross-sections of novel electrodes constructed in accordance with the present invention. FIGURE 4 is a diagrammatical illustration of a fuel cell utilizing the novel electrodes of the invention.

More specifically, FIGURE 1 illustrates an electrode structure with a porous conductive metal bonded to a porous plastic matrix. In a fuel cell, the polymer membrane can front either the electrolyte of the cell in the event the polymer membrane is hydrophilic; or in the event the polymer membrane is hydrophobic, it will front the fuel reactant side with the conductive catalytic layer being in contact with the electrolyte.

FIGURE 2 illustrates a sandwich-type electrode having multiple layers with the first and third layers of the electrode being a porous conductive catalytically activating metal, with the second layer being a porous plastic matrix, and the fourth layer being a permselective membrane (ion-permeable membrane).

In FIGURE 3, a sandwich-type structure is shown wherein a conductive catalytic metal is sandwiched between a porous hydrophilic plastic matrix and a hydrophobic matrix, constructed by pressing the catalytically activating surfaces of two electrode structures of the type shown in FIGURE 1 in intimate contact with each other. When utilized in a fuel cell, the hydrophobic plastic matrix will be in contact with the fuel gas and the hydrophilic layer in contact with the electrolyte.

FIGURE 4 illustrates the use of the novel electrodes in a fuel cell. Thus, electrode J is a sandwich-type electrode illustrated in FIGURE 3. Fuel is passed into fuel compartment H through inlet F with gaseous impurities being vented through outlet G. The oxidizing electrode L comprises a porous plastic matrix coated on one surface thereof with a porous conductive metal. Air is passed into the oxidizing compartment K through inlet I and vented through outlet E. Electrolyte C, for example a 28 percent aqueous potassium hydroxide electrolyte, is contained between electrodes J and L and serves as an ion-transfer medium. If desired, the electrolyte can be circulated by suitable means through electrolyte inlet and outlet A and B. Electrical current is removed through external circuit M.

As is apparent, an electrode structure of the instant invention can be tailored for virtually any fuel cell system in order to meet the requirements of any particular electrolyte or fuel. Thus, by proper selection of the polymer support material, the electrode surface facing the electrolyte can be either hydrophilic or hydrophobic as desired, to correspond to the particular electrolyte and fuel employed.

The instant electrodes as apparent from the above description, can be employed in fuel cells using virtually any of the prior art electrolytes. As is well known, for an efficient fuel cell, it is necessary that the electrolyte remain substantially invariant and have a high ionic conductivity. The alkaline electrolytes such as potassium carbonate, sodium hydroxide, potassium hydroxide, or an aqueous solution of the alkanolamines are particularly suitable. However, acid electrolytes such as sulfuric acid, phosphoric acid, etc. may be employed, or aqueous solutions of organic compounds such as aqueous solutions of formamide and its derivatives. An outstanding feature of the electrode structures of the instant invention is that by the proper selection of materials, virtually any available electrolyte can be conveniently used and yet function at its optimum capacity.

The catalysts which are used to coat the porous plastic polymer are pure elements, alloys, oxides or mixtures thereof, belonging to groups IB, IIB, IV, V, VI, VII and VIII of the Periodic Table and the rare earth elements. It has been found through experimental work as well as through a study of the literature that metals of these groups function favorably as activators in fuel cell electrodes depending, for a proper selection of a particular material, upon the fuel employed. One element or a group of elements, as for example, palladium, platinum, and nickel are particularly suitable as the activating material when hydrogen is used as the fuel gas. If another fuel is employed, some other catalytic metal can be selected, such as rhodium which is particularly suitable for low molecular weight hydrocarbon gases, such as ethane, propane and butane. More specifically, the catalytic materials which may be used in making the instant structures are:

Group IB—silver, gold, copper.
Group II—beryllium, magnesium, zinc, cadmium, mercury.
Group IV—titanium, zirconium, tin, hafnium, lead.
Group V—vanadium, phosphorous, arsenic, antimony, tantalum, bismuth.
Group VI—sulfur, chromium, selenium, tellurium, tungstem, molybdenum.
Group VII—manganese, rhenium.
Group VIII—iron, cobalt, nickel, ruthenium, rhodium, palladium, osmium, iridium, platinum.
Rare Earth Elements—cerium, lanthanum, thorium, uranium, etc.

In fuel cells utilizing the instant electrodes, the carbonaceous fuels such as hydrogen, carbon monoxide, methane, methanol, propane, and kerosene in vapor or liquid form have been found to be particularly advantageous both from diffusion characteristics and economic considerations. By the proper selection of the polymer support materials and catalysts of the electrode, the requirements of any particular fuel which is available can be met to obtain optimum performance. Other fuels, in addition to the carbonaceous fuels, are operable, the proper selection being within the ability of one skilled in the art.

The instant electrodes can be utilized in fuel cell systems operating within a relatively broad temperature range. However, the usual operating range is from about 20–240° C. although temperatures in excess of this range can be employed, as for example, as high as 250–350° C. and above, depending to a large extent upon the fuel and electrolyte employed. As a general rule, the higher the temperature, the greater the electrochemical reaction for a given time period.

Having described the invention in general terms, the following examples are set forth to more fully illustrate the preferred embodiments of the invention. Parts are by weight unless otherwise specified.

*Example 1*

A polyethylene porous plastic sheet five mils thick, having a porosity of 80% and having 90% of the pores in the range of from one to about five microns is immersed in a 5% aqueous potassium hydroxide solution and agitated for one minute. The sample is washed in distilled water, and thereafter immersed, with agitation, for one minute in a sensitizing solution composed of 100 grams stannous chloride, 500 ml. concentrated hydrochloric acid and 4000 ml. of water. The sample is again washed in distilled water.

The sensitized polyethylene sample is placed in a flat bottom, glass container only slightly larger than the polyethylene sample. The polyethylene sample is spread flat and attached to the bottom of the container by taping so that the surface of the plastic to be silvered is in a horizontal plane and faces upward. Preferably, the sample is spread in a fixture so that the surface of the sample is elevated ⅛ to ¼ inch from the bottom of the container, thus, any sludge produced during the operation will tend to accumulate at the bottom of the bath container rather than on the surface of the sample.

Approximately six ml. of a silver solution per square centimeter of the sample is placed in the bath container. (The silverizing solution is prepared by dissolving 40 grams silver nitrate in 800 ml. of water and then dissolving 20 grams of potassium hydroxide in the solution. Concentrated ammonia solution is added slowly with vigorous stirring. The brown precipitation formed upon addition of potassium hydroxide to the silver nitrate solution dissolved with the addition of ammonia. Ammonia is added until the solution is completely clear except for a small amount of heavy precipitation at the bottom of the container which will appear to remain unaffected by the addition of ammonia. An 8% solution of silver nitrate is added until the solution is slightly cloudy. Precaution: this solution is unstable and should be stored in a brown bottle and discarded after approximately 24 hours.) After the silverizing solution is deposited on the polyethylene, 1½ ml. of a reducing solution per square centimeter of polyethylene surface to be coated is added to the bath. (The reducing solution is prepared as follows: 90 grams of granulated sugar is dissolved in one liter of water and then four ml. of nitric acid is added. The solution is boiled for five minutes, cooled and 157 ml. of ethyl alcohol is added as a preservative.) The bath is agitated for nine minutes after the addition of the reducing solution and then the polyethylene sample is removed from the bath using care to avoid touching the silvered surface. The sample is quickly washed twice with water to remove any smudge from the silvered surface. The silvered surface is then lightly wiped with a wet absorbent cellulose sponge to remove any stains. The sample is thoroughly washed with water.

The porous polyethylene silverized structure is used as the oxidizing electrode in a hydrogen-oxygen fuel cell employing a 28% potassium hydroxide electrolyte and operating at a temperature of from about 100–125° C. The cell will sustain a current density of 150 ma./cm.$^2$ per 0.85 volt for an extended period of time without signs of deterioration.

*Example 2*

The silverized porous polyethylene sheet of Example 1 is coated on the unsilverized surface with a thin film of palladium, approximately 0.8 micron thick, by applying to the surface of the sample a 10% aqueous solution of palladium nitrate and heating to a temperature of about 55° C. After the porous film thickness reached approximately one micron, the porous polyethylene sheet was placed in an oven at 150° C. and a current of hydrogen gas was passed through to produce a palladium activated surface on one side and a silverized surface on the other substrate.

The structure when used as a hydrogen electrode in a fuel cell exhibited good electrochemical properties.

*Example 3*

A square polystyrene sheet 8 mils thick, having a porosity of 60% and having 90% of the pores in the range of from one to about 10 microns is immersed in a 5% aqueous sodium hydroxide solution and agitated for one minute. The sample is washed in distilled water and thereafter coated on one surface with a nickel salt solution (this solution is composed of 30 grams nickel chloride, 50 grams ammonia chloride, 100 grams sodium citrate, 10 grams sodium hypophosphate and enough water to make 1000 cc.) by attaching the sample to the bottom of a container by tape so that the surface of the plastic to be coated is in a horizontal plane and faces upward and adding sufficient nickel salt (approximately 10 ml. per square centimeter) to the bath to cover the sample and deposit a nickel film. The sample remained in the bath for a period of approximately 15 minutes. The plastic sample is removed from the bath and dried by passing moderately heated inert gas (30–35° C.) over the sample. The porous polystyrene film after drying is uniformly coated on one surface with a thin porous metal film.

The nickelized porous polystyrene sheet is then coated on the unactivated surface with a thin film of palladium of approximately one micron thickness by the method described in Example 2. The structure when used as the anode in a low temperature carbonaceous fuel cell using a 25% aqueous sulfuric acid electrolyte exhibited good electrochemical properties.

*Example 4*

A polyurethane film eight mils thick having a porosity of 60% and having 95% of the pores in the range of from 5–12 microns is coated with a dispersion of colloidal graphite and nickel activated carbon black dispersed in dimethylethyl ketone and containing 2% of a phenol-formaldehyde binding agent. The carbon black is activated by immersing the carbon black in a solution of 30 grams nickel chloride, 50 grams sodium hydroxyacetate, 10 grams sodium hypophosphate and sufficient water to make 1000 cc. and increasing the temperature with agitation to 70° C. The temperature is held at 70° C. for 30 minutes before the carbon black is filtered and dried in a vacuum oven at a temperature of 150° C. The dried activated powder is sprayed on one surface of the polyurethane foam and pressed under di-electric heat.

The electrode structure thus formed possessed good electrochemical properties when used as the fuel electrode in a fuel cell utilizing a 28% sodium hydroxide electrolyte and operated at a temperature of from 60–85° C.

*Example 5*

A 25 mil thick Amberplex C–1 cation permeable membrane is applied to the structure of Example 4 by pressing under dielectric heat. (The Amberplex C–1 membrane is prepared by polymerizing a mixture of about 92 parts by weight of styrene and eight parts by weight of divinyl benzene and comminuting the resulting polymeric material until finally divided particles are obtained. One hundred parts by weight of the polymer is then sulfonated by reacting the polymer with about 175 parts of chlorosulfonic acid for three minutes at the reflux temperature of the mix and then for about 50 hours at room temperature. The sulfonated polymer is treated with a large volume of the water to destroy any excess chlorosulfonic acid as well as any acid chloride which may remain. Two parts by weight of the sulfonated resin is then mixed with one part by weight of polyethylene and the resulting mixture is pressed into a membrane.) The structure obtained possessed good catalytic properties when used in a fuel cell system, having the ion exchange membrane fronting an aqueous electrolyte.

*Example 6*

An ion permeable polyvinyl alcohol membrane is applied to the nickel surface of the porous electrode structure of Example 3 above, by pressing the electrode and polyvinyl alcohol membrane under di-electric heat. The resultant structure possessed good electrochemical properties when used as the fuel electrode in a fuel cell system with the polyvinyl alcohol film fronting a 28% aqueous sodium hydroxide electrolyte.

*Example 7*

A homoporous nickel plate having a thickness of .125 inch, a 60% porosity and a pore size distribution ranging from 15–30 microns is coated with a thin film of a polyvinyl alcohol emulsion. The film is allowed to cure at room temperature by standing over night and the process is repeated to apply a second and third polymer layer to the structure. The electrode when used in a fuel cell on the fuel gas side utilizing an 18% sodium carbonate electrolyte and operated at a temperature in the range of 80–100° C. exhibited a high degree of electrochemical stability.

In Examples 1–7, metallic materials other than those set forth in the examples can be used to replace the activating catalytic film. It is possible to employ any catalytic metal such as beryllium, magnesium, zinc, cadmium, mercury, titanium, zirconium, tin, hafnium, lead, vanadium, phosphorous, arsenic, antimony, tantalum, bismuth, sulfur, chromium, selenium, tellurium, tungsten, manganese, rhenium, iron, gold, cobalt, silver, nickel, ruthenium, rhodium, palladium, osmium, iridium and platinum.

Additionally, in Examples 1–7, the polymer membrane can be replaced by any polymer materials such as polystyrene, polytetrafluoroethylene, monochlor-trichlor polyethane, polyethylene, polypropylene, cellulose, methyl methacrylate, polyvinylidene, chloride, copolymers of vinyl chloride and polyvinylidene chloride, polyvinyl ethyl ether, polyvinyl acetate, polymethacrylate, butadiene styrene copolymers, styrenated alkyl resins and chlorinated rubber. The proper selection of a suitable material is within the ability of one skilled in the art.

Further, the application of the activating metal film to the polymer layer can be performed using conventional procession such as chemical, electrochemical or vacuum techniques.

It should be appreciated that the instant invention is not to be construed as being limited by the illustrative examples. It is possible to produce still other embodiments without departing from the inventive concept herein disclosed. Such embodiments are within the ability of one skilled in the art.

What is claimed is:

1. As a fuel cell electrode, a sandwich-type structure wherein a porous hydrophobic polymer matrix having a porous conductive catalytically activating metal layer in intimate contact with one surface thereof and a porous hydrophilic polymer matrix having a porous conductive catalytically activating metal layer in intimate contact with one surface thereof, are sandwiched together, with the catalytic surfaces of said polymer matrices being in intimate contact with each other.

2. The fuel cell electrode of claim 1 wherein the catalytically activating metal layer of the two polymer matrices are the same.

3. A fuel cell for the generation of electrical energy directly from a fuel and oxidant comprising an electrolyte, at least one oxidizing electrode, at least one fuel electrode, said electrodes being in contact with said electrolyte, and means for providing fuel cell reactants to said electrodes, at least one of said electrodes being a sandwich-type structure wherein a porous hydrophobic polymer matrix having a porous conductive catalytically activating metal layer in intimate contact with one surface thereof and a porous hydrophilic porous matrix having a porous conductive catalytically activating metal layer in intimate contact with one surface thereof are sandwiched together with the catalytic layers of said polymer matrices being in intimate contact with each other, said hydrophobic polymer being in contact with a fuel cell reactant and the hydrophilic polymer surface being in contact with the electrolyte of the fuel cell.

4. A fuel cell for the generation of electrical energy directly from a fuel and oxidant comprising an electrolyte, at least one oxidizing electrode, at least one fuel electrode, said electrodes being in contact with said electrolyte, and means for providing fuel cell reactants to said electrodes, at least one of said electrodes being a sandwich-type structure wherein a porous conductive catalytically activating metal layer is in intimate contact at one surface with a porous hydrophobic polymer matrix and the second surface is in contact with a porous hydrophilic polymer matrix, said hydrophobic polymer matrix being in contact with a reactant and the hydrophilic polymer surface being in contact with the electrolyte of the fuel cell.

5. A fuel cell for the generation of electrical energy directly from a fuel and oxidant comprising an electrolyte, at least one oxidizing electrode, at least one fuel electrode, said electrodes being in contact with said electrolyte, and means fro providing fuel cell reactants to said electrodes, at least one of said electrodes comprising a porous polymer matrix having porous conductive catalytically activating metal layers in intimate contact with the two major surfaces thereof.

6. The fuel cell of claim 5 wherein the catalytically activating metal layers on the two major surfaces are the same and the porous polymer matrix is hydrophilic.

7. The fuel cell of claim 5 wherein the porous polymer matrix is hydrophobic with said matrix having a first metal on one major surface and a second metal on the second major surface.

8. A fuel cell for the generation of electrical energy directly from a fuel and oxidant comprising an electrolyte, at least one oxidizing electrode, at least one fuel electrode, said electrodes being in contact with said electrolyte, and means for providing fuel cell reactants to said electrodes, at least one of said electrodes comprising a porous hydrophobic polymer matrix having porous conductive catalytically activating metal layers in intimate contact with the two major surfaces thereof and a permselective membrane layer in intimate contact with one of said catalytically activating layers, said permselective membrane being in contact with the electrolyte of the fuel cell.

9. A fuel cell for the generation of electrical energy directly from a fuel and oxidant comprising an electrolyte, at least one oxidizing electrode, at least one fuel electrode, said electrodes being in contact with said electrolyte, and means for providing fuel cell reactants to said electrodes, ate least one of said electrodes comprising a porous hydrophobic polymer matrix having a porous conductive catalytically activating metal layer in intimate contact with one surface, the said catalytically activating metal layer being in contact with the electrolyte of the fuel cell.

10. A fuel cell for the generation of electrical energy directly from a fuel and oxidant comprising an electrolyte, at least one oxidizing electrode, at least one fuel electrode, said electrodes being in contact with said electrolyte, and means for providing fuel cell reactants to said electrodes, at least one of said electrodes comprising a porous hydrophobic polymer matrix having a nickel activated carbon black layer in intimate contact with one surface, the said carbon black layer being in contact with the electrolyte of the fuel cell.

References Cited by the Examiner

UNITED STATES PATENTS

| | | | |
|---|---|---|---|
| 353,141 | 11/1886 | Kendall | 136—86 |
| 1,243,111 | 10/1917 | Sanders et al. | 136—86 |
| 2,048,347 | 7/1936 | Martus et al. | 136—52 |
| 2,805,274 | 9/1957 | Eisen | 136—120 |
| 2,860,175 | 11/1958 | Justi | 136—86 X |
| 2,913,511 | 11/1959 | Grubb | 136—86 |
| 2,947,797 | 8/1960 | Justi et al. | 136—86 |
| 3,071,637 | 1/1963 | Horn et al. | 136—122 |
| 3,097,116 | 7/1963 | Moos | 136—122 |
| 3,098,772 | 7/1963 | Taschek | 136—120 |
| 3,116,170 | 12/1963 | Williams et al. | 136—86 |
| 3,117,034 | 1/1964 | Tirrell | 136—86 |
| 3,134,697 | 5/1964 | Niedrach | 136—86 |

FOREIGN PATENTS 60,901   8/1954   France.
(Addition to No. 1,078,903)

JOHN H. MACK, *Primary Examiner.*

JOHN R. SPECK, *Examiner.*

S. A. PARKER, W. VAN SISE, *Assistant Examiners.*